US008861396B2

(12) United States Patent
Schlenk et al.

(10) Patent No.: US 8,861,396 B2
(45) Date of Patent: Oct. 14, 2014

(54) TRAFFIC-LOAD DEPENDENT POWER REDUCTION IN HIGH-SPEED PACKET SWITCHING SYSTEMS

(75) Inventors: Ralph Schlenk, Erlanger (DE); Christian Hermsmeyer, Eckental (DE)

(73) Assignee: Alcatel Lucent, Boulogne-Billancourt (FR)

( * ) Notice: Subject to any disclaimer, the term of this patent is extended or adjusted under 35 U.S.C. 154(b) by 86 days.

(21) Appl. No.: 13/264,263

(22) PCT Filed: Apr. 22, 2010

(86) PCT No.: PCT/EP2010/055336
§ 371 (c)(1),
(2), (4) Date: Oct. 13, 2011

(87) PCT Pub. No.: WO2010/130545
PCT Pub. Date: Nov. 18, 2010

(65) Prior Publication Data
US 2012/0063353 A1    Mar. 15, 2012

(30) Foreign Application Priority Data
May 12, 2009    (EP) ..................................... 09160076

(51) Int. Cl.
| H04L 12/801 | (2013.01) |
| H04L 12/813 | (2013.01) |
| H04L 12/861 | (2013.01) |
| H04L 12/825 | (2013.01) |
| H04L 12/841 | (2013.01) |
| H04L 12/12 | (2006.01) |
| H04L 12/803 | (2013.01) |

(52) U.S. Cl.
CPC .............. *H04L 47/125* (2013.01); *H04L 47/33* (2013.01); *H04L 47/20* (2013.01); *H04L 49/90* (2013.01); *H04L 47/25* (2013.01); *H04L 47/28* (2013.01); *Y02B 60/34* (2013.01); *H04L 12/12* (2013.01)
USPC ....................................................... 370/253

(58) Field of Classification Search
USPC .......... 370/252, 230, 419, 231, 235; 709/225; 398/60
See application file for complete search history.

(56) References Cited

U.S. PATENT DOCUMENTS 6,307,839 B1 * 10/2001 Gerszberg et al. ............ 370/235
6,748,435 B1 *  6/2004 Wang et al. ................... 709/225
(Continued)

FOREIGN PATENT DOCUMENTS

JP         2006253862         9/2006

OTHER PUBLICATIONS

W. Frohberg; Das Moore'sche Gesetz Fur IP Verkehr; 9.ITG Fachtagung Photonische Netze; Leipzig, Germany, 2008.
(Continued)

*Primary Examiner* — Yemane Mesfin
*Assistant Examiner* — Derrick V Rose
(74) *Attorney, Agent, or Firm* — Carmen Patti Law Group, LLC (57) ABSTRACT

The invention relates to a method and devices for a packet switching system for traffic-load dependent power reduction in packet switching systems. In order to reduce the power consumption of a packet switching system, the method comprises the steps of determining a traffic rate for incoming data packets at the upstream packet processing device; processing the incoming data packets; transmitting an indication of the determined traffic rate from the upstream packet processing device to the downstream packet processing device at a time prior to the time that the processed data packets for which the traffic rate has been determined are transmitted to the downstream packet processing device; and adjusting available packet processing resources at the downstream packet processing device based on the received traffic rate indication.

14 Claims, 7 Drawing Sheets

(56) References Cited

U.S. PATENT DOCUMENTS

| | | | |
|---|---|---|---|
| 2004/0136712 A1* | 7/2004 | Stiscia et al. | 398/60 |
| 2005/0249227 A1 | 11/2005 | Wang et al. | |
| 2006/0190593 A1 | 8/2006 | Wang et al. | |
| 2006/0209712 A1 | 9/2006 | Morioka et al. | |
| 2013/0170349 A1* | 7/2013 | Wang et al. | 370/231 |

OTHER PUBLICATIONS

L. Roberts; Beyond Moore's Law: Internet Growth Trends; IEEE Computer; 33:1; 2000; p. 117-119.

SIA Semiconductor Industry Association; International Technology Roadmap for Semiconductors 2007 Edition; Austin, TX 2007; http://public.itrs.net.

D. Matzke; Will Physical Scalability Sabotage Performance Gains?; IEEE Computer; 30:9; pp. 37-39; 1997.

E. Lee et al; CMOS High-Speed I/Os—Present and Future; Proc. 21st IEEE International Conference on Computer Design; San Jose, CA; 2003; pp. 454-461.

Xilinx Inc.; Virtex-5 TXT Platform Delivers First Single FPGA Solution for Building 40G and 100G Telecommunications Equipment; Sep. 2008; <http://press.xilinx.com/phoenix.zhtml? c=212763& p=irol-news/Article&ID=1199762&highlight=>.

M. Duelk et al; 100 Gigabit Ethernet—Applications, Features, Challenges; Proc. 25th IEEE International Conf. on Computer Communications; Barcelona, Spain; 2006; pp. 1-5.

V. Venkatachalam et al; Power Reduction Techniques for Microprocessor Systems; ACM Computing Surveys; 37:3; 2005; pp. 195-237.

C. Toal et al; An RLDRAM II Implementation of a 10Gbps Shared Packet Buffer for Network Processing; Pro. Second NASA/ESA Conf on Adaptive Hardware and Systems; Edinburch, UK; 2007; pp. 613-618.

Interlaken Alliance; Interlaken Protocol Definition; Ref 1.1; Jul. 2006; <http://www.interlakenalliance.com/Interlaken_Protocol_Definition_v1.1.pdf>.

Gupta, Maruti; Singh, Suresh; Greening of the Internet; Computer Communication Review, ACM, New York, NY, USA; vol. 33, No. 4, Oct 1, 2003; pp. 19-26; XP001224066; ISSN: 0146-4833.

* cited by examiner

TRAFFIC-LOAD DEPENDENT POWER REDUCTION IN HIGH-SPEED PACKET SWITCHING SYSTEMS

TECHNICAL FIELD

The invention relates to a method and devices for a packet switching system for traffic-load dependent power reduction in packet switching systems.

BACKGROUND

Internet traffic has and is expected to further grow exponentially along Moore's law. Consequently, network line speed has doubled about every two years in the past. However, integrated circuit and memory clock rates have not improved to the same extent, one reason being that on-chip wire delays between device logic do not scale with the ratio of geometry sizes but rather stay constant. A common solution to address this issue of interconnect delays in high-speed design is a parallelization of resources, such as parallel memory banks of traffic managers or a high-number of comparatively low-speed chip-to-chip interfaces.

Such a parallelization of resources for high-speed data packet processing comes at the expense of required space and power consumption, and ultimately, higher costs. Furthermore, the increased power consumption combined with the increasingly smaller hardware design of today's computers and packet-processing network devices results in high power densities. These high power densities impair chip reliability and life expectancy, increase cooling costs, and, for large data centers, even raise environmental concerns.

In state-of-the-art designs, two forms of power consumption, dynamic power consumption and static power consumption, can be reduced by circuit and logic level techniques (e.g. transistor design, low-power interconnects), caching architectures (e.g. adaptive caches), and dynamic voltage scaling (DVS).

However, the majority of these techniques are too complex for high-speed, i.e., 100 Gb/s and above, packet processing devices, such as network processors (NPs), traffic managers (TMs) and switch fabrics (SFs). For example, the DVS method, which modulates the chip's clock frequency and supply voltage, is very hard to incorporate in high-speed packet processing devices which have special requirement for bandwidth, processing latency and jitter.

SUMMARY

Therefore, there is a need to solve the above mentioned issues to provide a more efficient and cost-effective power reduction for high-speed packet switching systems.

In view of the above problems of the prior art, it is an object of the invention to provide a more efficient method and packet switching system being capable of reducing the power consumption of packet switching systems, particularly of high-speed packet switching systems of 100 Gb/s and above.

This object is achieved by the subject-matter according to the independent claims. The dependent claims refer to preferred embodiments of the invention.

According to an aspect of the invention, a method and a system for reducing the power consumption of a packet switching system having an upstream packet processing device and a downstream packet processing device is proposed. The upstream packet processing device may in particular be a network processor. The downstream packet processing device may in particular be a traffic manager and/or a switch fabric.

The method may comprise the step of determining a traffic rate for incoming data packets at the upstream packet processing device. By way of example, the incoming data packets may be stored in a pre-classification buffer of the upstream packet processing device to manage interface oversubscription, to filter out bursts, to perform an initial classification, and to determine the packet length. The determined packet length may then be used in the subsequent measuring of the traffic rate for the incoming data packets which may include measuring the number in ingress data packets. The traffic rate may be determined by a traffic metering unit. According to a further aspect of the invention, the incoming data packets may be processed in the upstream data processing device and then transmitted from the upstream packet processing device to the downstream packet processing device. By way of example, the packet processing at the upstream data processing device may include at least one of the following: packet classification, queuing, address learning and management of the forwarding table, bridging functionality including address and class of service (CoS) mapping, MPLS label generation or swapping.

The method may include the step of transmitting an indication of the determined traffic rate ahead of time from the upstream packet processing device to the downstream packet processing device, i.e., at a time prior to the time that the processed data packets for which the traffic rate has been determined are transmitted to the downstream packet processing device. The time difference between the transmission of the traffic rate indication and the transmission of the processed data packets corresponding to the traffic rate may be at least the time needed to activate or de-activate a packet processing resource of the downstream packet processing device. This traffic rate indication may be a value derived from the determined traffic rate of ingress data packets and may comprise information to describe the traffic rate. According to a further aspect of the invention, the available packet processing resources at the downstream packet processing device may be adjusted based on the received traffic rate. The available resources may be adjusted by switching on or off some of the parallel packet processing resources of the downstream packet processing device to adapt the active resources to the traffic load so that spare processing capacities can be powered down to save energy, to reduce heat generation and to increase the life time of the processing units.

In the context of this invention, a packet processing resource may include a data memory, in particular parallel memory banks, data packet transmission lines, or any other resource for handling data packets, such as storing, queuing, forwarding, or changing data packets.

In other words, by sending a determined load metering information for a set of data packets from an upstream to a downstream data packet processing device while the data packets for which the load metering information has been measured are still being processed at the upstream packet processing device, the method and system according to the invention may transmit a traffic forecast value to a downstream packet processing device based on which the downstream packet processing device may activate or de-activate parallel packet processing resources before the data packets for which the traffic forecast has been determined arrive at the downstream packet processing device. The steps of transmitting the determined traffic rate can be conducted before or in parallel to the step of processing the incoming data packets at the upstream packet processing device as long as the time difference between the transmission of the traffic rate and the transmission of the corresponding data packets provide sufficient time for the downstream packet processing device to adjust its resources based on the transmitted traffic rate information. By using the load metering information measured at an upstream packet processing device, the downstream device avoids the need to have its own built-in metering unit that usually requires a buffer and increases the network latency and complexity of the device. By transmitting the processing load in advance to a downstream packet processing device, the downstream packet processing device has sufficient time to adjust its resources before the processed data packets for which the traffic rate has been measured arrives at the downstream device. In this way, the downstream packet processing device can use the delay time that is caused at the upstream packet processing device due to the packet processing to optimize its resource configuration based on the traffic rate information received in advance of the data packets. As a result, the downstream packet processing device can manage its resources more efficiently, thereby reducing energy consumption.

According to another aspect of the invention, the method may include the step of load-distributing the data packets across a packet processing resource with parallel processing units by minimizing the number of utilized parallel packet processing units. Conventional load-balancing approaches in high-speed packet switching systems are load-balancing data packets across parallel processing resources by evenly distributing the data packets across the available parallel packet processing resources, so that the processing load is shared by all processing resources. By contrast, the invention proposes to distribute the load to as few processing units as possible to maximize the number of idle processing units which can then be powered down so save power consumption if the determined traffic rate indicates a lower traffic forecast. By way of example, instead of using all available parallel transmission lines of a packet processing device with a low utilization, the invention proposes to distribute the data packet across as few parallel transmission lines as possible which may facilitate switching off a number of the un-used transmission lines as indicated by the determined traffic rate.

According to another aspect of the invention, at the step of transmitting the traffic rate information, the upstream packet processing device may add a header field comprising the traffic rate determined for the incoming data packets that are still being processed at the upstream packet processing device to at least one data packet already processed by the upstream packet processing device. As a consequence, the signaling load between the upstream and the downstream packet processing device would not increase as the information determining the traffic rate would be carried with the downstream data packets. Alternatively, the upstream packet processing device may transmit the traffic rate using a separate control message or data packet. Means to transfer and evaluate load-metering information is not bound to in-band transmission, but can also happen out of band, directly, or by indirect observation of other facilities.

According to a further aspect of the invention, the traffic rate may be determined by determining an information rate value and/or a burst rate value for the incoming data packets. The determined values for the information rate and the burst rate may be used for an accurate determination of the resource needs of a packet processing device based on which the available resource can be dynamically adjusted to increase the power efficiency. It may be beneficial to determine the information rate value and/or the burst rate value separately for each incoming packet flow or for an aggregate packet bandwidth depending on the complexity of the downstream packet processing device.

A further aspect of the invention relates to an upstream packet processing device and a downstream packet processing device of a packet switching system, wherein the upstream packet processing device may include a traffic metering unit configured to determine a traffic rate for incoming data packets. The upstream packet processing device may include means for transmitting the determined traffic rate from the upstream packet processing device to the downstream packet processing device at a time prior to the time that the processed data packets for which the traffic rate has been determined are transmitted to the downstream packet processing device. The upstream packet processing device may further include a data packet processor to process ingress data packets and may include a data packet transmitter to transmit the processed data packets from the upstream packet processing device to the downstream packet processing device. The downstream packet processing device may include a resource manager configured to adjust available packet processing resources at the downstream packet processing device based on the received traffic rate.

In the context of this invention, an upstream packet processing device may serve multiple downstream packet processing devices, e.g., a first downstream packet processing device being configured to receive data packets directly from the upstream packet processing device, and a second downstream packet processing device being configured to receive data packets from the upstream packet processing device via the first downstream packet processing device. The upstream packet processing device may also serve a chain of downstream packet processing devices. A downstream packet processing device in the context of the invention receives and uses the traffic rate information that has been determined and transmitted by at least one upstream packet processing device to adjust the packet processing resources at the downstream packet processing device.

Preferably, the upstream packet processing device may comprise a buffering unit for buffering, pre-classification and oversubscription management of the incoming data packets. This may be beneficial due to the fact that this buffering unit may be able to hold hundreds of frames to filter out bursts and to determine the packet length for the subsequent traffic metering.

According to another aspect of the invention, the upstream packet processing device may be a network processor of a high-speed network backbone comprising processing capabilities, preferably parallel packet processing capabilities, to perform packet classification, forwarding and tagging and the downstream packet processing device may be a traffic manager of a network backbone comprising parallel processing capabilities configured to implement traffic management, queuing, segmentation and reassembly of data packets, and interface management to a switching fabric and wherein the traffic manager may be connected via a multi-lane transmission interface to the network processor device. Applying the invention to a traffic manager is in particular beneficial due to the fact that a traffic manager is a main contributor to the total power dissipation of a switching subsystem. By way of example, the resource manager of the traffic manager device may be a memory controller to control a set of parallel memory banks of the downstream packet processing device or an interface controller to control a set of multiple transmission lanes of the downstream packet processing device.

By way of example, the network processor and the traffic manager may be implemented on a line card that is connected to a switching card through a high-speed interconnect. The method and system of the invention are preferably implemented in a high-speed packet switching network, e.g. networks of 100 Gb/s and above.

According to another aspect of the invention, the resource manager of the packet switching system may activate or de-activate one or more parallel resources of parallel processing elements. According to a further aspect of the invention, a high-speed traffic manager device, may comprise dozens of parallel memory banks, pipeline loops and multi-lane interfaces to achieve the desired throughput which may be partly powered down based on the determined traffic rate to save energy, to reduce heat generation and the cooling requirements, and to increase the life-time of the packet processing units.

According to another aspect of the invention, it is proposed that the resource manager of the downstream packet processing device may comprise a state machine that changes a state of packet processing resources based on the received traffic rate. By way of example, the state machine may be configured to select a state and to manage the transition between the states for each of the parallel processing components of the device based on the received information rate and burst rate values, wherein the state determines the available parallel processing resources of parallel processing components.

In order to use load-metering information determined at an upstream packet processing device along the transmission flow through a packet switching system to adapt the transmission performance to the actual demand, a further aspect of the invention relates to a packet switching system that may comprise a plurality of network processors and a plurality of traffic managers and, as a further downstream packet processing device, a switch fabric comprising multiple switch devices cross-connected to the plurality of parallel traffic managers. The resource manager of the switch fabric may be configured to receive all traffic rates transmitted from the plurality of upstream network processors to the switch fabric via the traffic manager and to manage the packet processing resources of the switch fabric based on an aggregated traffic rate information determined from all received traffic rates. The aggregated traffic rate information determines a full ingress traffic load forecast for the switch fabric, based on which the switch fabric resource manager can switch-on or off some of its packet processing resources to increase its power consumption efficiency.

According to another aspect of the invention, a cross-connected switching device of the switch fabric may configured to be de-activated if all transmission links connecting the switching device with a plurality of traffic managers have been de-activated by the traffic managers based on the received traffic rates at the traffic managers.

According to another aspect of the invention, the resource manager may adjust the available packet processing resources by partly powering down parallel packet processing elements to reduce static power dissipation and/or by clock-gating packet processing resources to reduce dynamic power dissipation.

DESCRIPTION OF THE DRAWINGS

The invention is explained below in an exemplary manner with reference to the accompanying drawings, wherein.

DETAILED DESCRIPTION

Figure 1:
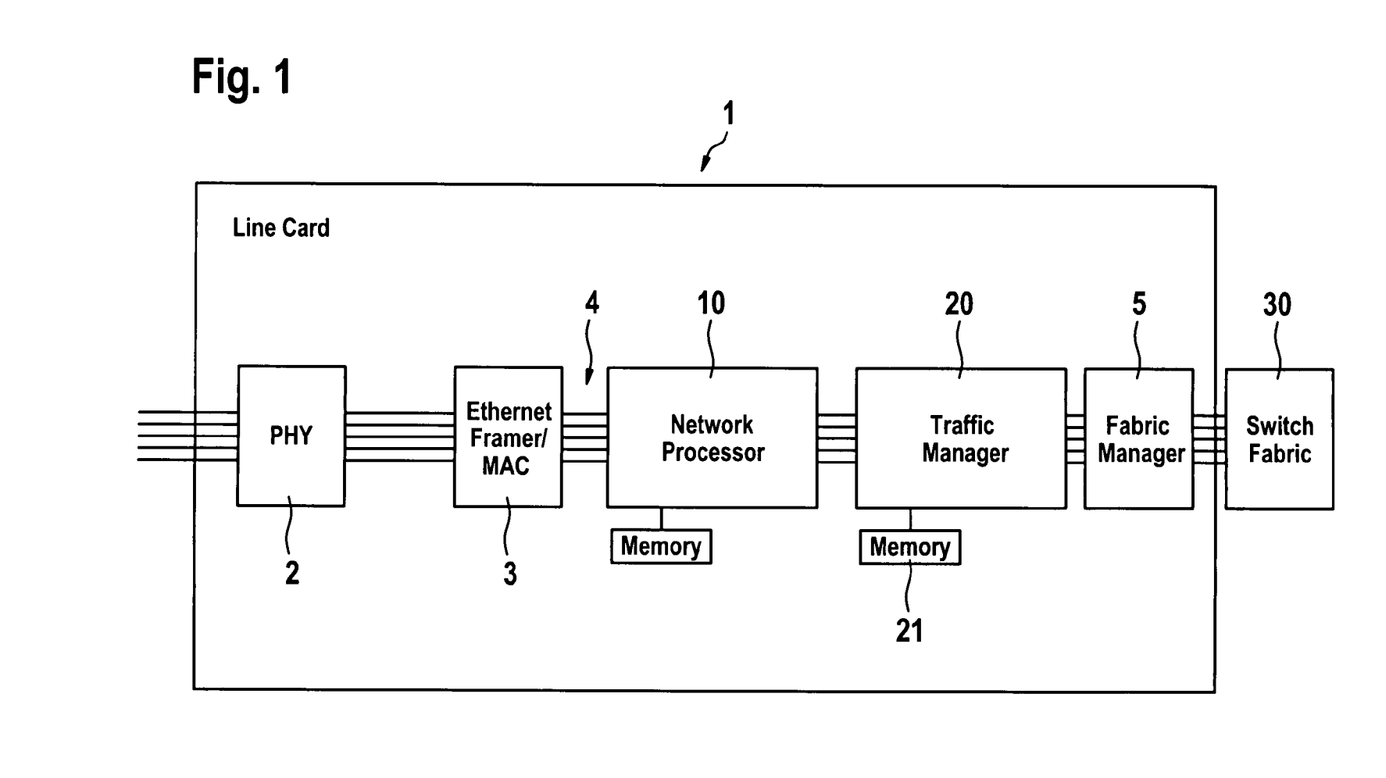
FIG. 1 illustrates a block diagram of a high-speed packet switching subsystem comprising a network processor and a traffic manager.

FIG. 1 illustrates a block diagram of a high-speed packet switching subsystem comprising a network processor and a traffic manager. A PHY device 2 and a MAC/Framer device 3 are for Ethernet transport and pass the incoming network data on to a network processor (NP) 10 and a traffic manager (TM) 20 for forwarding, classification, prioritization and flow-control. The PHY device 2, the MAC/Framer device 3, the NP 10 and the TM 20 and a fabric manager 5 interfacing the backplane are typically implemented on a line card 1. The line card 1 sends data to a switch fabric device (SF) 30, which passes the data to other line cards. The NP 10, the TM 20 and the SF 30 are related to Ethernet switching functions. The devices are connected via parallel multi-lane transmission lines for high-speed packet transmissions of 100 Gb/s and above. The method of the invention may be implemented in such a high-speed packet switching subsystem comprising a network processor and a traffic manager which is further described in FIG. 2.

Figure 2:
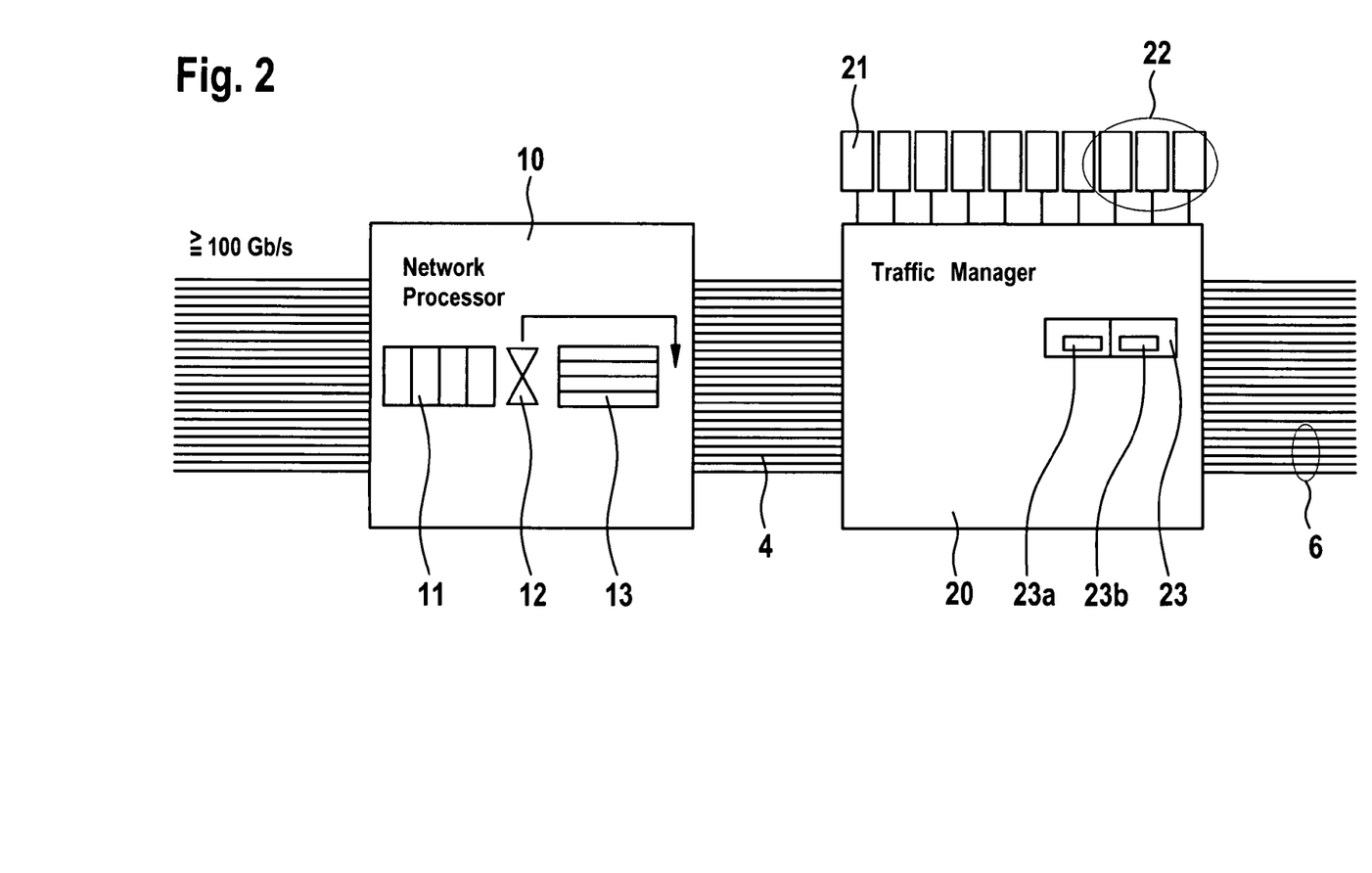
FIG. 2 illustrates a block diagram of an upstream packet processing device and a downstream packet processing device according to an embodiment of the invention.

FIG. 2 illustrates a block diagram of an upstream packet processing device and a downstream packet processing device according to an embodiment of the invention. The upstream packet processing device is an ingress network processor 10 and the downstream packet processing device is a traffic manager 20.

Figure 7:
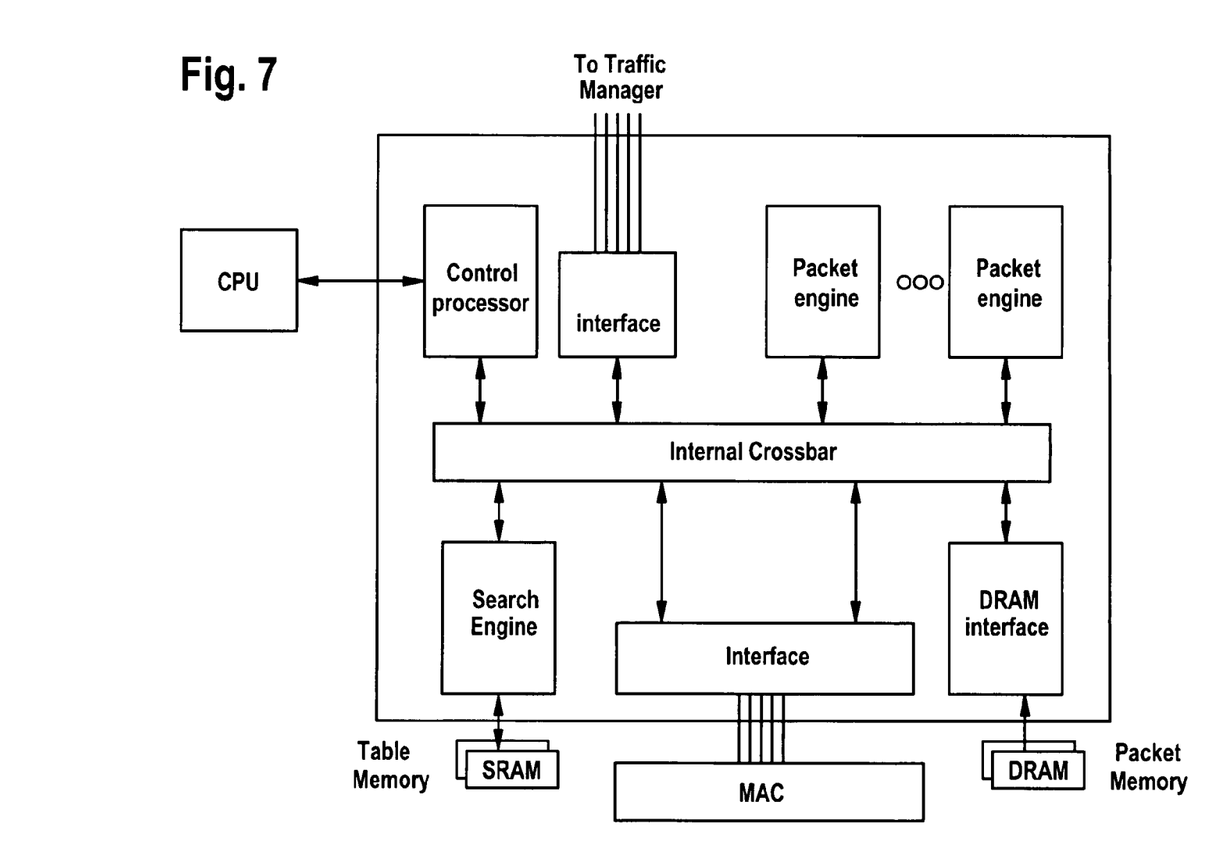
FIG. 7 illustrates an exemplary architecture of a network processor.

Network processing refers to processing incoming network data packets according to some set of rules, and transmitting them onto an outgoing transmission line. The NP 10 according to an embodiment of the invention comprises a pre-classification buffer 11 for buffering incoming data packets to manage interface oversubscription, to filter out bursts and to determine the packet length for the ingress data packets. The packet length is used for the subsequent metering by means of a traffic meter 12 which determines the traffic rate of the incoming data packets. The NP 10 further comprises a number of Processing Elements (PEs) 13 for processing the incoming data packets after the packets have passed the metering unit 12. The PEs 13 may be implemented as scaled-down Reduced Instruction Set Computer (RISC) cores in which the instruction set has been customized for handling and processing network data packets. In particular, the NP 10 with its PEs 13 performs various functions such as packet classification, filtering, forwarding, classifying, metering, marking, policing and counting. For example, the NP may be configured for address learning and management of the forwarding table, bridging functionality including address and class of service (CoS) mapping, VLAN tag processing, MPLS label generation or swapping. Typically, NPs are configured for parallel processing capabilities containing multiple PEs 13. Different implementations for NPs of high-speed packet switching systems exist, e.g. regarding architecture, complexity, or programmability. An exemplary architecture of an NP 10 is shown in FIG. 7.

As illustrated in FIG. 2, the ingress NP 10 is connected to a downstream TM 20 via parallel multi-lane transmission lines. TMs 20 typically reside on a line card next to a fabric manager because they implement the output queuing necessary for the switch. The TM 20 performs packet queuing, typically realized on the ingress card 1 with Virtual Output Queues (VOQs) next to a backplane. Alternatively, the TM and the FM might be integrated into one device. The TM 20 is often a major contributor to the total power dissipation of a switching subsystem. One reason is that traffic managers require large amounts of memory 21 for storing data packets. The memory 21 may include embedded memory as well as support for high-speed external memories. Another reason is the high number of transceivers for the multi-lane interfaces towards network processor and switch fabric.

The TM 20 further comprises a resource manager 23 configured to adjust the packet processing resources of the TM 20 based on the traffic rate determined by the traffic meter 12.

For example, the resource manager 23 of the traffic manager device comprises a memory controller 23a to temporarily de-activate some of the parallel memory modules 22 depending on the traffic load to reduce the power consumption of the TM 20 and comprises an interface controller 23b to de-activate particular lanes of the transmission interfaces towards NP and/or FM.

Figure 8:
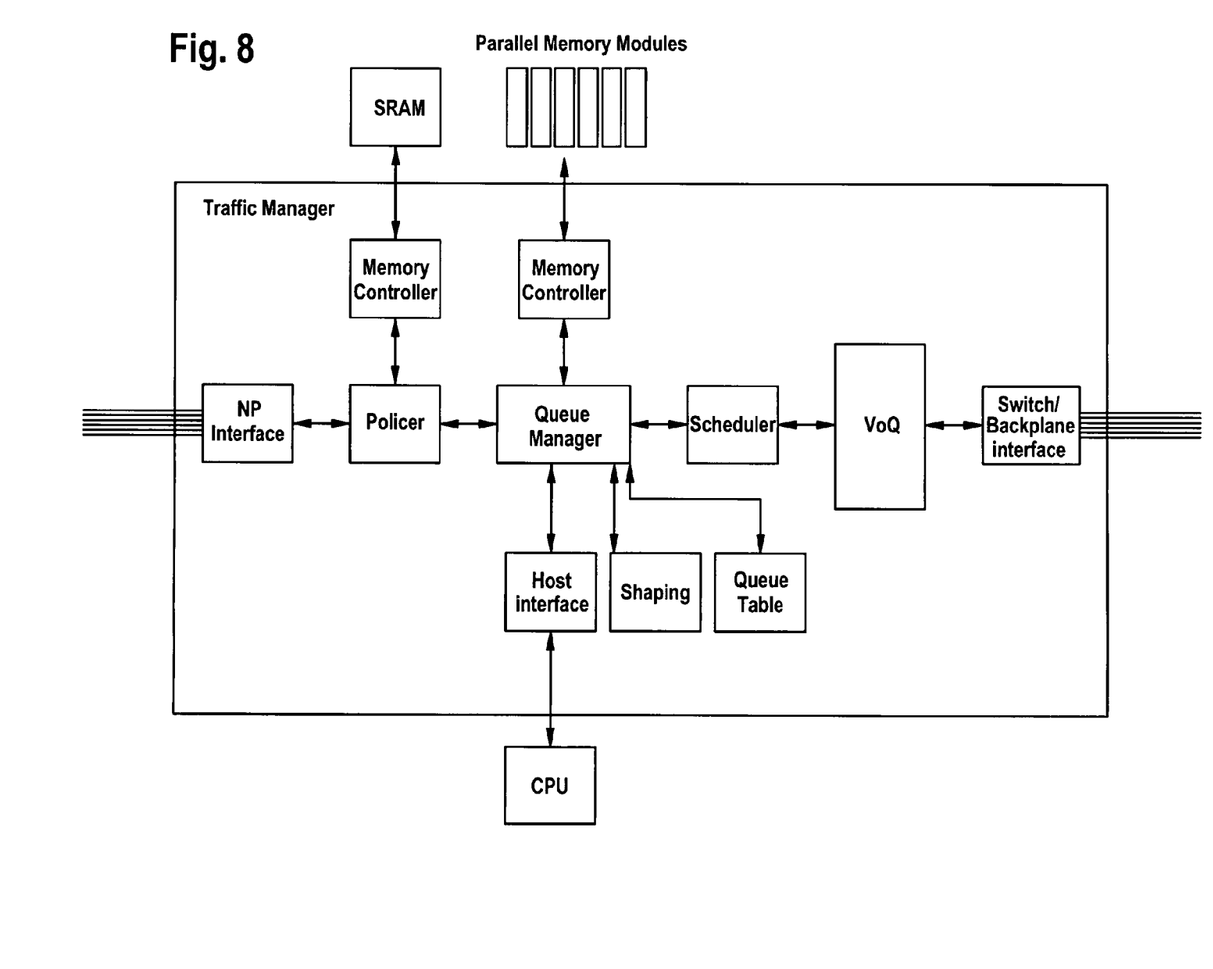
FIG. 8 illustrates an exemplary architecture of a traffic manager.

The TM comprises further components (not shown) such as a queue manager that maintains the traffic queues, which are pointers to the packet data stored in an external memory. A separate queue can be kept for each traffic class or traffic flow. However, in contrast to the NP 10, the TM 20 typically does not have metering capabilities, as this would normally increase the latency and complexity of the packet switching subsystem. FIG. 8 shows an exemplary architecture of a traffic manager.

The description of the NP 10 and TM 20 is given by way of example. NPs and TM may vary in design and functions that are implemented. Additionally, some of the functions of the NP may be implemented within the TM and vice versa.

Figure 3:
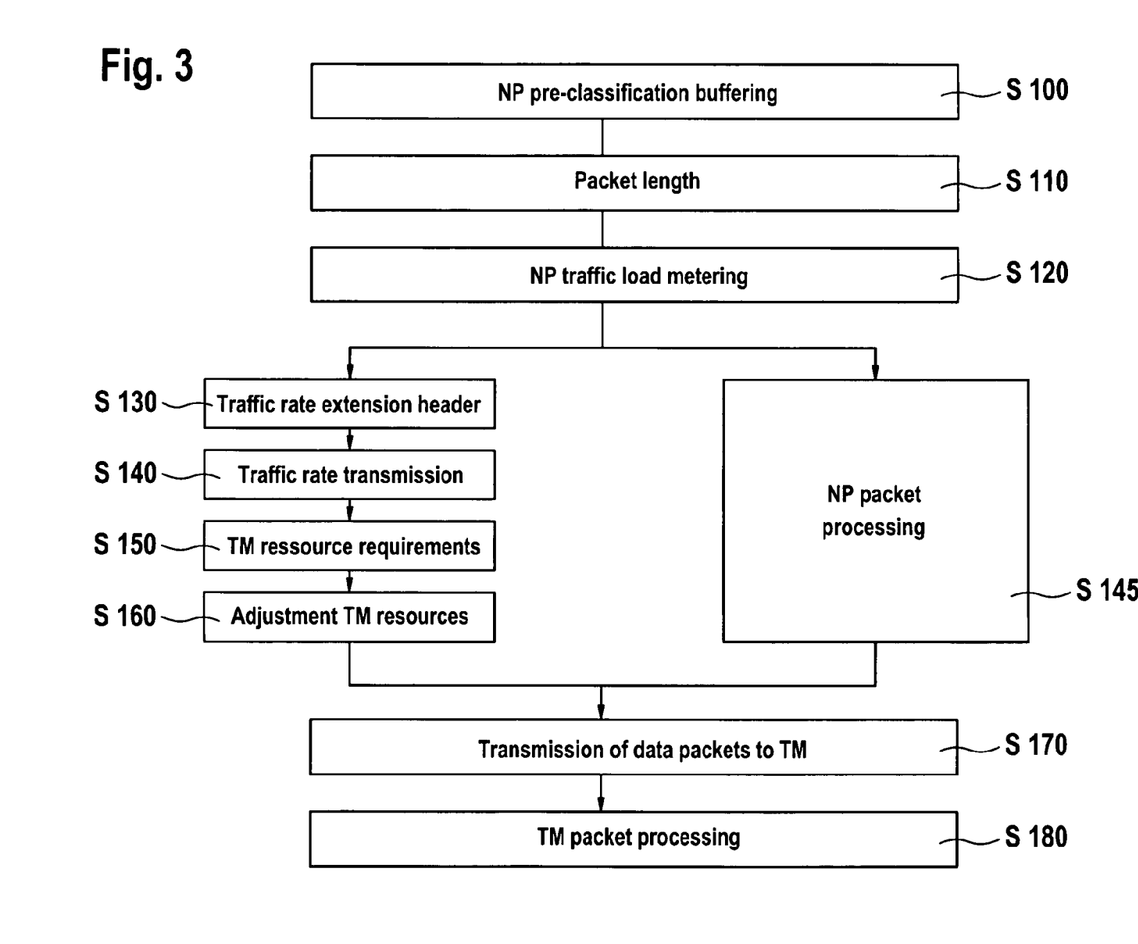
FIG. 3 shows flow diagram of steps involved in a traffic-load dependent power reduction in a packet switching system according to an embodiment of the invention.

FIG. 3 shows a flow diagram of steps involved in a traffic-load dependent power reduction in a packet switching system according to an embodiment of the invention.

In step 100, a pre-classification buffer 11 of the NP 10 buffers incoming data packets to manage interface oversubscription, to filter out bursts and, as set forth in step S110, to determine the packet length for the ingress data packets. The packet length is used for the subsequent metering, and to enforce basic Quality of Service (QoS) before the packets enter the—potentially congested—processing pipeline, i.e., array of processing elements 13. Having passed the oversubscription/pre-classification buffer 11, a traffic meter 12 determines the traffic rate of the incoming data packets in step S120. For example, the traffic rate may be determined by measuring the information rate and the resulting burst rate of the (shaped) traffic flow. These measured rates are used for limiting the traffic rate into the pipeline of processing elements and will also be used for the subsequent power reduction mechanism. Depending on the complexity of the downstream TM 20, the traffic rate can be measured for each packet flow or for the aggregate packet bandwidth. Transmission of the workload information from NP to TM is achieved by prepending an additional 'Expected Rate' extension header field to already processed packets in step S130, while the packets for which the traffic rate has been measured are still being processed in the NP's processing elements 13. In step 140, the determined traffic rate is then transmitted from the NP 10 to the TM 20 at a time prior to the time that the processed data packets for which the traffic rate has been determined are transmitted to the TM 20.

This ensures that traffic load information travels ahead of the actual data in the transmission path. Means to transfer and evaluate load-metering information is not bound to in-band transmission, but can also happen out of band, directly, or by indirect observation of other facilities. Alternatively, the upstream packet processing device may transmit the traffic rate using a separate control message or data packet.

Figure 4:
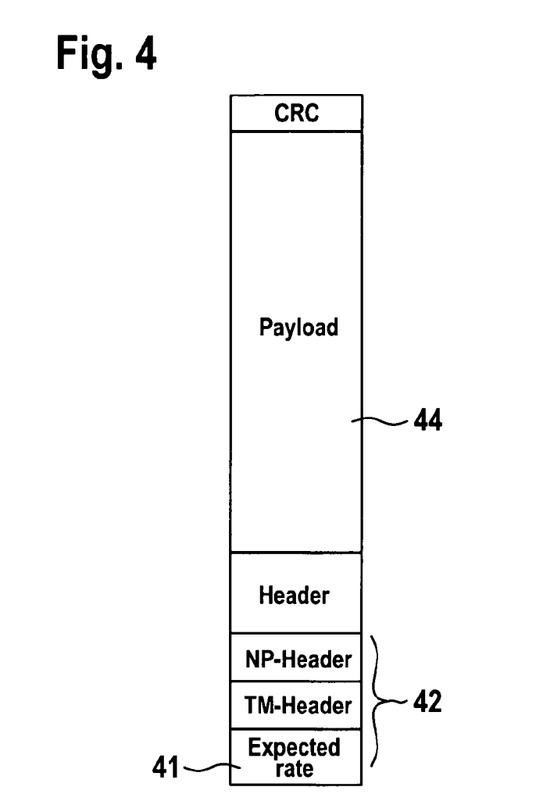
FIG. 4 illustrates an example of a data packet where an additional header field comprising the determined traffic rate information was added according to an embodiment of the invention.

FIG. 4 illustrates an example of a data packet 40 where an additional 'Expected Rate' header field 41 comprising the determined traffic rate information was added according to an embodiment of the invention. In addition to the 'Expected Rate' header, the data packet 40 comprises additional internal meta-information since the NP 10 is taking the forwarding decision for ingress packets and selects the correct queue for the TM 20, which typically requires an extra header to be added in front of every packet. The modified header of incoming data traffic enables the traffic manager 20 to prioritize and decide which packets should be dropped and retransmitted, when packets should be sent to the switch fabric 30, and how traffic should be shaped when sending onto the network.

In particular, the transmitted traffic rate represents a traffic forecast for the TM 20 as the traffic rate information is transmitted ahead of the data packets for which it has been determined and while these data packets are still being processed by the processing elements 13 of the NP 10 in step S145 of FIG. 3. The resource manager 23 of the TM 20 analyzes in step 150 the transmitted traffic rate to determine the required processing resources. In step S160, the resource manager 23 then adjusts its available packet processing resources based on the received traffic rate. For example, parallel memory banks 21, interface lanes 4, pipeline loops or other processing elements can be (partly) shut down in dependence of the traffic load.

After the data packets have been processed at the NP 10 in step 145, the data packets are transmitted to the TM 20 in step 170 where the data packets are processed in step 180, wherein the TM has already adjusted its processing resources for the incoming data packets, thereby avoiding unnecessary spare capacities and increasing its power efficiency. Typical latency times for packet processing at the upstream packet processing device are in the range of 100 μs, reaching sometimes several ms, whereas typical activation times for power-wake-up circuits reside in the sub-μs for lower-level circuits and in the range of 10 μs and above for larger logical blocks, such as memory modules. If the latency of the upstream packet processing device for packet processing is greater than the activation/de-activation time for power-wake-up circuits in the downstream packet processing device, then transmitting the traffic rate information will provide sufficient time to adjust the packet processing resources at the downstream device if the traffic rate is transmitted before the data packets, for which the traffic rate has been determined, are processed in the NP.

Any of the steps S130, 140, 150 or S160 may be conducted before or in parallel to the step S145 as long as the time difference between the transmission of the traffic rate and the transmission of the corresponding data packets provide sufficient time for the downstream packet processing device to adjust its resources based on the transmitted traffic rate information.

It is a further advantage that the TM 20, by using the traffic rate information measured at the NP 10, does not require any complex packet characterization capabilities to adjust its processing resources.

Figure 5:
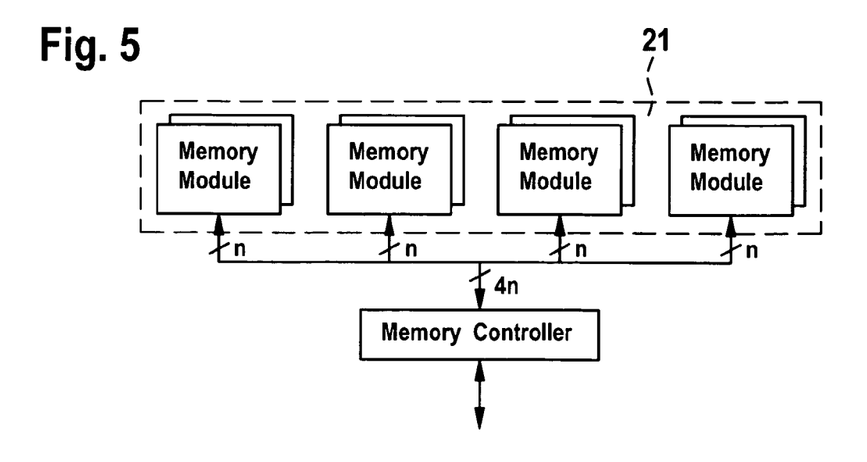
FIG. 5 illustrates a packet buffer of a traffic manager comprising a memory controller and a number of parallel memory units.

FIG. 5 illustrates a packet buffer of a traffic manager comprising a memory controller and a number of parallel memory units. Due to memory performance limitations, the packet buffer memory 21 is realized using a number of parallel 'banks' and a memory controller. Even if the latest 800 MHz DDR3-SDRAMs are used for the memory modules of a 100 Gb/s packet buffer, a distribution of packet data across 10-20 banks is typically necessary to achieve the desired throughput. This number and the resulting power dissipation will even increase for next-generation equipment. The parallel memory modules are controlled by a memory controller that activates or de-activates the memory banks based on the transmitted traffic rate values. The memory controller thus performs the function of the resource manager.

The resource manager 23 may include a state machine that changes a state of packet processing resources based on the received traffic rate. For example, the state machine can define a number of traffic rate intervals defined by a lower and upper limit value of the received traffic rate e.g., based on the information rate and burst rate values, determining the required packet processing resources wherein each interval corresponds to a pre-determined resource state of the TM 20. The point in time that this resources state is needed is defined by the average time difference between the arrival of the transmitted traffic rate at the TM 20 and the arrival of the transmitted data packets for which the traffic rate has been determined.

The state machine then can assign to each traffic rate interval a state of processing resources, e.g. the number of active memory banks out of the total number of parallel memory banks, if the traffic rate value is within a pre-determined traffic rate interval then the state machine initiates a transition to the state corresponding to this interval. The packet switching system according to the invention is configured to provide the traffic rate information at the TM 20 prior to the actual data for which the traffic rate has been measured wherein the time difference between the transmission of the traffic rate and the transmission of the processed data packets corresponding to the traffic rate is at least the time needed to activate or de-activate the adaptive data processing resources of the TM device.

Figure 6:
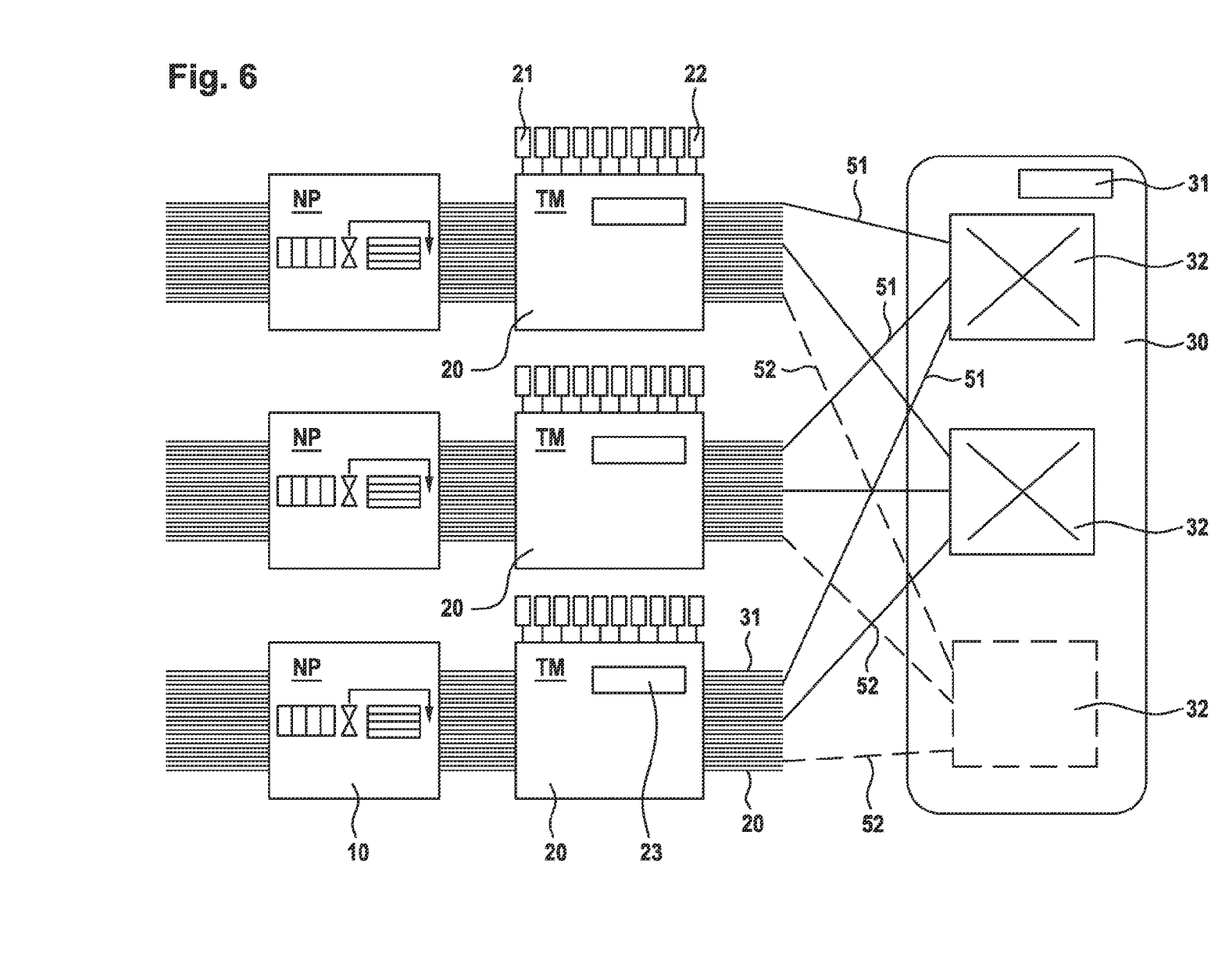
FIG. 6 illustrates a block diagram of a high-speed packet switching system comprising a plurality of network processors, traffic managers and switching entities according to another embodiment of the invention.

FIG. 6 illustrates a block diagram of a high-speed packet switching system comprising a plurality of network processors 10 as upstream packet processing devices, a plurality of traffic managers 20 as first downstream packet processing devices and a switch fabric 30 as second packet processing device with switching entities 32 according to another embodiment of the invention. The switching devices 32 are cross-connected to the plurality of parallel traffic managers 20. According to this embodiment, the traffic rate information or load-metering information is transmitted and used along the complete transmission flow through a packet switching system in order to adapt transmission performance to the actual demand, enabling a further, system-wide power reduction in unused transmission resources.

According to the embodiment, a subset of the multiple transmission lanes between traffic manager and network processor can be activated or de-activated by an interface controller in dependence of the aggregate of packet bandwidth into the traffic manager.

According to a further embodiment, a subset of the multiple transmission lanes, starting downstream of the traffic manager, and connecting it with a (centralized) switch fabric, can be powered down according to the actual aggregate of packet bandwidth into the central switch fabric. Typically, the central packet switching matrix is constructed out of an array of smaller-size cross-connect devices, and ingressing traffic from a line termination device (packet processing line card) is load-balanced across the array. By de-activating the subset of the multiple lanes in an orchestrated way across all line cards, parts of the centralized array of switching components, finally device-by-device can be dynamically powered down completely.

The traffic managers 20, as first downstream devices, evaluate the load-metering information transferred with the header of packets from the NPs 10. Regulating state machines of the TMs 20 then deactivate memory banks 23 and/or transmission links 52. The resource manager 31 of the central switch matrix observes the states of the links attached to the switching entities, and automatically powers down devices, once that all links of e.g. one device are de-activated. Alternatively, switch devices 32 cross-connected to the plurality of parallel traffic managers 20 may be configured to be powered down automatically if all links of a switch device to an upstream traffic manager are de-activated.

According to a further embodiment, the resource manager 31 of the switch fabric device 30 is configured to receive all traffic rates transmitted from the plurality of network processors 10 to the switch fabric via the traffic managers 20 and manages the packet processing resources of the switch fabric based on an aggregated traffic rate information determined from all received traffic rates. By aggregating all ingress traffic rate values, the resource manager 31 can determine the traffic load for the entire switch fabric and adjust the number of active processing resources to increase its energy efficiency. For example, the resource manager 31 can adjust the available packet processing resources by partly powering down parallel packet processing elements to reduce static power dissipation and/or by clock-gating packet processing resources to reduce dynamic power dissipation.

The method and packet switching system according to the invention is most energy-efficient if the packet processing devices are configured to use the received traffic rate information to load-balance the data processing across the available processing units in a way to minimize the number of utilized processing resources, or in other words, to maximize the number of idle processing resources, e.g., memory banks or transmission links. For example, instead of operating the processing components at a 50% load, it is beneficial to operate half the processing units at a 100% load and powering down the other half of the processing units if they will not be needed as indicated by the transmitted traffic forecast. Preferably, the resource manager of a downstream packet processing device is configured to distributing traffic load across a packet processing resource with parallel processing units by minimizing the number of utilized parallel packet processing units. By distributing the load across as few parallel processing units as possible instead of evenly distributing the data packets across the available parallel packet processing resources, the powering-down of un-used packet processing resources based on the received traffic rate value will be faster and the number of resources that can be powered down will increase. As indicated in FIG. 6, the resource manager 23 of the TMs is configured to distribute the data packets to as few memory modules 21 and transmission lines 51 as possible. The memory modules 22 and transmission lines 52 are not served by the resource manager 23 as long as the traffic load is smaller than the processing capacity of the memory modules 21 and transmission lines 51. By analyzing the received traffic rate information, the resource manager 23 can determine if the idle processing units 22 and 52 can be powered down to save energy consumption. Without an available estimate on the future traffic load, idle processing units cannot be powered as easily due to the unpredictable nature of the traffic load and the time needed to de-activate and re-activate a processing resource. Distributing the traffic load across a few fully utilized processing resources also facilitates the resource management of subsequent downstream packet processing devices. For example, the lower cross-connect switching device 32 can be switched-off more easily and faster if the TMs 20 that transmit data packets to the switch fabric 30 are configured to distribute their packets first to the upper transmission lines 51 and to only use the lower transmission lines 52 if the upper transmission lines are fully utilized.

FIG. 7 illustrates an exemplary architecture of a network processor (NP) suitable for an implementation of an embodiment of the invention. The NP according to this embodiment comprises a data packet processor (i.e., the packet engine units) and means for transmitting the determined traffic rate indication and the processed data packet to a traffic manager which are implemented within the control processor and the interface to the traffic manager. The NP further comprises a traffic metering unit (not shown).

FIG. 8 illustrates an exemplary architecture of a traffic manager TM 20 suitable for an implementation of an embodiment of the invention. For example, the resource manager according to the invention could be implemented by the memory controller and/or the NP interface controller. The resource manager is typically configured using programmable chips or hardware components.

Features, components and specific details of the structures of the above-described embodiments may be exchanged or combined to form further embodiments optimized for the respective application. As far as those modifications are apparent for an expert skilled in the art they shall be disclosed implicitly by the above description without specifying explicitly every possible combination.

The invention claimed is:

1. A method of reducing the power consumption of a packet switching system having an upstream packet processing device and a downstream packet processing device, the method comprising the steps of:
   determining a traffic rate for incoming data packets at the up-stream packet processing device;
   processing the incoming data packets;
   transmitting an indication of the determined traffic rate from the upstream packet processing device to the downstream packet processing device at a time prior to the time that the processed data packets for which the traffic rate has been determined are transmitted to the downstream packet processing device, wherein when transmitting the indication of the determined traffic rate, the upstream packet processing device adds a header field comprising the traffic rate determined for the incoming data packets that are still being processed at the upstream packet processing device to at least one data packet already processed by the upstream packet processing device;
   adjusting available packet processing resources at the downstream packet processing device based on the received traffic rate indication; and
   transmitting the processed data packets from the upstream packet processing device to the downstream packet processing device.

2. The method according to claim 1, wherein the time difference between the transmission of the traffic rate indication and the transmission of the processed data packets corresponding to the traffic rate is at least the time needed to activate or de-activate a packet processing resource of the downstream packet processing device.

3. The method according to claim 1, further comprising the step of determining the traffic rate via a determination of an information rate value and/or a burst rate value for the incoming data packets.

4. The method according to claim 3, further comprising the step of determining the information rate value and/or the burst rate value separately for each incoming packet flow.

5. The method according to claim 3, further comprising the step of determining the information rate value and/or the burst rate value for an aggregate packet bandwidth.

6. The method according to claim 1, further comprising the step of load-distributing the data packets across a packet processing resource with parallel processing units, wherein a number of utilized parallel packet processing units is minimized.

7. An upstream packet processing device comprising:
   a traffic metering unit configured to determine a traffic rate for incoming data packets;
   a data packet processor;
   a means for transmitting an indication of the determined traffic rate from the upstream packet processing device to a downstream packet processing device at a time prior to the time that the processed data packets for which the traffic rate has been determined are transmitted to the downstream packet processing device, wherein the upstream packet processing device is configured to add a header field comprising the traffic rate determined for the incoming data packets that are still being processed at the upstream packet processing device to at least one data packet already processed by the upstream packet processing device; and
   a data packet transmitter to transmit the processed data packets from the upstream packet processing device to the downstream packet processing device.

8. The upstream packet processing device according to claim 7, wherein the upstream packet processing device is a network processor of a network backbone comprising:
   a buffering unit for buffering, pre-classification and over-subscription management of the incoming data packets; and
   parallel processing capabilities to perform packet classification, forwarding, filtering and tagging.

9. A downstream packet processing device comprising:
   means for receiving a transmitted indication for a traffic rate determined at an upstream packet processing device at a time prior to the time that processed data packets for which the traffic rate has been determined are received at the downstream packet processing device, wherein the upstream packet processing device is configured to add a header field comprising a traffic rate determined for incoming data packets that are still being processed at the upstream packet processing device to at least one data packet already processed by the upstream packet processing device; and
   a resource manager configured to adjust available packet processing resources at the downstream packet processing device based on the received traffic rate indication.

10. The downstream packet processing device according to claim 9, wherein the downstream packet processing device is a traffic manager of a network backbone comprising:
   parallel processing capabilities configured to implement traffic management, queuing, segmentation and reassembly of data packets, and
   interface management to a switching fabric and a network processor,
   wherein the traffic manager is connected via a multi-link transmission interface to the upstream packet processing device; and
   wherein the resource manager comprises a state machine that changes a state of packet processing resources based on the received traffic rate indication.

11. The downstream packet processing device according to claim 10, wherein the parallel processing elements of the traffic manager that are managed based on the received traffic rate indication are parallel memory banks and/or pipeline loops and/or multiple transmission lanes of the interface towards a network processor.

12. The downstream packet processing device according to claim 9, wherein the downstream packet processing device is a switch fabric of a network backbone comprising multiple switch devices cross-connected to a plurality of parallel traffic managers, and
   wherein the resource manager of the switch fabric is configured to receive traffic rates transmitted from a plurality of network processors to the switch fabric and manages the packet processing resources of the switch fabric based on an aggregated traffic rate information determined from the received traffic rate indications.

13. The downstream packet processing device according to claim 12, wherein a cross-connected switching device of the switch fabric is configured to be de-activated if all transmission links connecting the switching device with a plurality of traffic managers have been de-activated by the traffic managers based on the received traffic rate indications at the traffic managers.

14. A packet switching system comprising:
   a network processor configured to determine a traffic rate for incoming data packets and transmit an indication of the determined traffic rate to a downstream packet processing device at a time prior to the time that processed data packets for which the traffic rate has been determined are transmitted to the downstream packet processing device, wherein the network processor is configured to add a header field comprising the traffic rate determined for the incoming data packets that are still being processed at the network processor to at least one data packet already processed by the network processor;
   a traffic manager configured to adjust available packet processing resources at the downstream packet processing device based on the received traffic rate indication; and
   a switch fabric comprising multiple switch devices cross-connected to a plurality of parallel traffic managers.

* * * * *